US007818077B2

(12) United States Patent
Bailey

(10) Patent No.: US 7,818,077 B2
(45) Date of Patent: Oct. 19, 2010

(54) ENCODING SPATIAL DATA IN A MULTI-CHANNEL SOUND FILE FOR AN OBJECT IN A VIRTUAL ENVIRONMENT

(75) Inventor: Kelly Daniel Bailey, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 1328 days.

(21) Appl. No.: 10/840,196

(22) Filed: May 6, 2004

(65) Prior Publication Data

US 2005/0249367 A1 Nov. 10, 2005

(51) Int. Cl.
*G06F 17/00* (2006.01)
*A63F 13/00* (2006.01)

(52) U.S. Cl. .......................................... 700/94; 463/35

(58) Field of Classification Search .................. 381/17, 381/310, 306, 18, 61; 463/35; 700/94
See application file for complete search history.

(56) References Cited

U.S. PATENT DOCUMENTS 4,281,833 A * 8/1981 Sandler et al. ................ 463/3
4,792,974 A * 12/1988 Chace .......................... 381/1
5,521,981 A * 5/1996 Gehring ....................... 381/17
5,633,993 A * 5/1997 Redmann et al. ............ 345/419
5,862,229 A * 1/1999 Shimizu ...................... 381/17
6,361,439 B1 * 3/2002 Kawamoto .................. 463/35
6,572,475 B1 * 6/2003 Okabe et al. ................. 463/30
6,760,050 B1 * 7/2004 Nakagawa ................. 715/848
6,959,094 B1 * 10/2005 Cascone et al. .............. 381/86
2003/0007648 A1 * 1/2003 Currell ....................... 381/61
2005/0179701 A1 * 8/2005 Jahnke ....................... 345/619

* cited by examiner

*Primary Examiner*—Vivian Chin
*Assistant Examiner*—Joseph Saunders, Jr.
(74) *Attorney, Agent, or Firm*—Frommer Lawrence & Haug LLP; John W. Branch

(57) ABSTRACT

A method for recording and playing back spatial sound data associated with an object in a scene of a virtual environment from the perspective of a character controlled by a user. Different types of spatial sound data can be encoded for different types of objects, e.g., fast moving, directional, slow moving and stationary objects. Based on at least the position, distance, and direction of the object in regard to the character, at least two channels of an audio file can be recorded with spatial sound data for subsequent playback in the virtual environment.

16 Claims, 9 Drawing Sheets

ENCODING SPATIAL DATA IN A MULTI-CHANNEL SOUND FILE FOR AN OBJECT IN A VIRTUAL ENVIRONMENT

FIELD OF THE INVENTION

The present invention relates to computer game systems, and in particular, but not exclusively, to a system and method for encoding spatial data using multi-channel sound files.

BACKGROUND OF THE INVENTION

As many devoted computer gamers may be aware, the overall interactive entertainment of a computer game may be greatly enhanced with the presence of realistic sound effects. However, creating a robust and flexible sound effects application that is also computationally efficient is a considerable challenge. Such sound effects applications may be difficult to design, challenging to code, and even more difficult to debug. Creating the sound effects application to operate realistically in real-time may be even more difficult.

Today, there are a number of off-the-shelf sound effects applications that are available, liberating many game developers, and other dynamic three-dimensional program developers, from the chore of programming this component, themselves. However, the integration of such a sound effects application with a game model that describes the virtual environment and its characters often remains complex. An improper integration of the sound effects application with the game model may be visible to the computer gamer by such actions as the sound of a weapon seeming to have no particular spatial relation to a location of the weapon in the game model, as well as other non-realistic actions, reactions, and delays. Such audio artifacts tend to diminish the overall enjoyment in the playing of the game. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
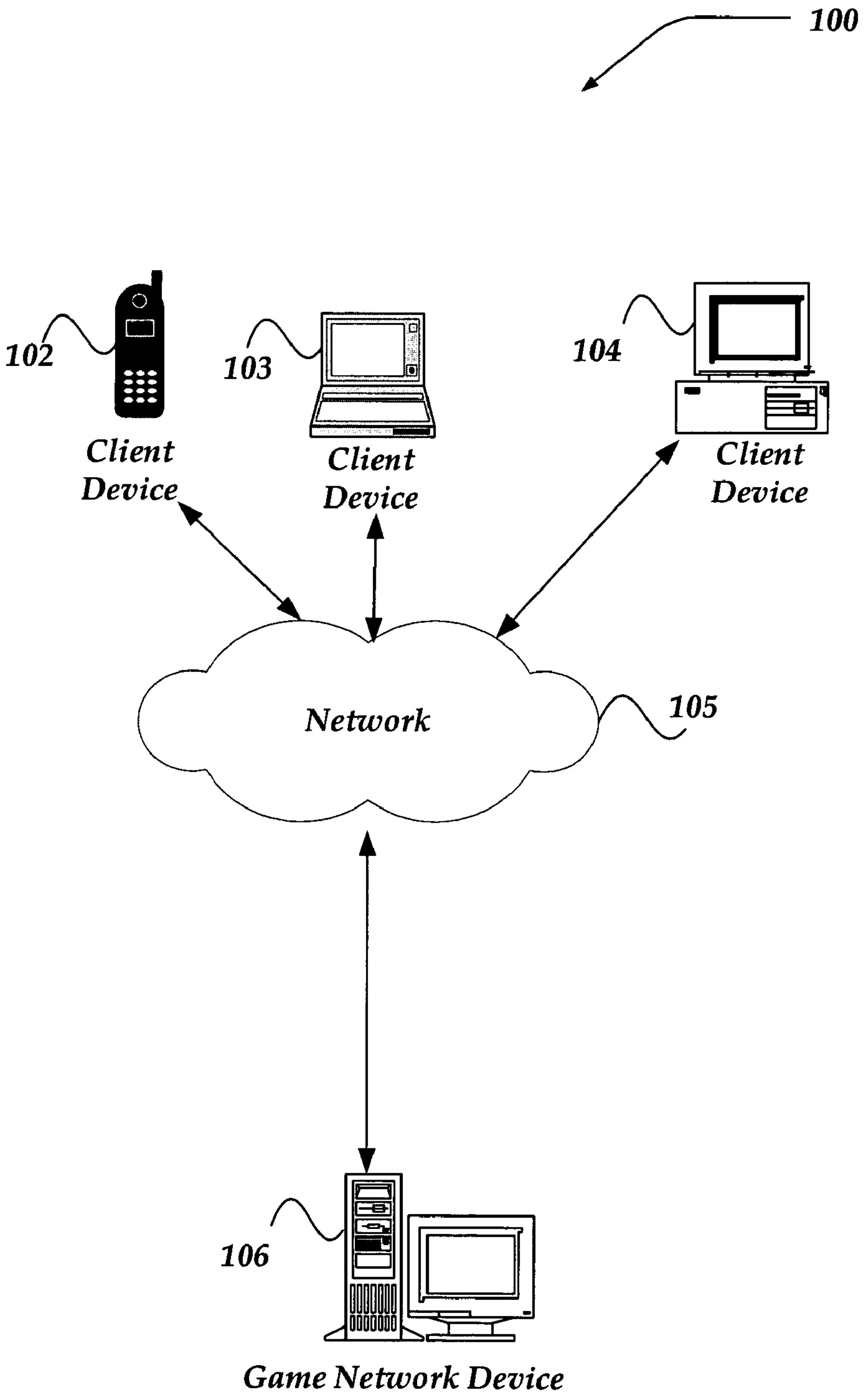
FIG. 1 illustrates one embodiment of an environment in which the invention operates.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed to a system, apparatus, and method for recording and playing spatial sound data associated with an object in a scene for a virtual environment, such as a video game, chat room, virtual world, and the like. Different types of spatial sound data can be encoded for different types of objects, e.g., fast moving, directional, slow moving and stationary objects. Based on at least the position, distance, and direction of the object in regard to the character, at least two channels of an audio file can be recorded with spatial sound data associated with the object for subsequent playback in a scene for a virtual environment.

For an exemplary fast moving object such as a virtual bullet, a plan view of the scene in the virtual environment is employed to calculate a line for the path of the moving object in regard to the character. Based at least in part on the speed of the moving object and how close the line passes by the character, one channel of an audio file is encoded with approaching spatial sound data and another channel of the file is encoded with retreating spatial sound data. As the fast moving object initiates movement towards the character, the encoded audio file is played back. Additionally, a pseudo Doppler effect can be simulated by the rapid switching between channels for sound amplification devices, such as speakers during the playback of the spatial approaching and retreating sound data for the fast moving object.

For an exemplary directional object such as a jet engine, spatial forward sound data is recorded in one channel of an audio file and spatial rearward sound data is encoded in another channel of the audio file. A plan view of the scene in the virtual environment is employed to determine the orientation (forward and/or rearward direction) and distance between the directional object and the character. Based on the determined direction, position, and distance, the playback of each channel in the audio file is mixed. For example, if the orientation of the directional object in regard to the character is somewhere between forward facing and rearward facing, the mixer blends and cross fades a corresponding percentage of each channel during playback of the audio file in the scene.

However, if a character is directly facing the front of a directional object, the channel including the spatial forward sound data is played back and the other channel including spatial rearward sound data is muted. Similarly, if the orientation of the object and character is reversed, the channel including the spatial rearward sound data is played back and the spatial forward sound data is muted.

For an exemplary stationary object such as a virtual explosion, spatial far sound data is encoded in one channel of an audio file and spatial near sound data is encoded in another channel of the file. Typically, the spatial far sound data includes primarily low frequency sounds such as thumps, echoes and other environmental sounds. The spatial near sound data includes additional high frequency sounds such as crashes, bangs, and other environmental sounds. In one embodiment, a low pass filter with a cutoff frequency below approximately 500 Hz is employed to create the spatial far sound data and another low pass filter with a cutoff frequency above approximately 10,000 Hz is employed to create the spatial near sound data from a sound previously associated with the stationary object. A plan view of the scene in a virtual environment can be employed to determine the distance between a stationary object and a character. Based at least in part on the determined distance, a mixer blends and cross fades a corresponding percentage of each channel during playback of the audio file in the scene.

However, if a character is disposed relatively near to the stationary object, the channel including the spatial near sound data is played back and the other channel including the spatial far sound data is muted. Similarly, if the character is disposed relatively far away from the stationary object, the channel including the spatial far sound data is played back and the spatial near sound data is muted.

An exemplary slow moving object such as a virtual vehicle is processed in a manner substantially similar to a stationary object in some ways, albeit different in other ways. For example spatial far sound data is encoded in one channel of an audio file and spatial near sound data is encoded in another channel of the file. The spatial far sound data includes primarily low frequency sounds and the spatial near sound data includes primarily high frequency sounds. In one embodiment, an actual helicopter rotor may be recorded at long range and used as far sound. The same rotor recorded at a close range may be used as near sound data for an implementation of a virtual helicopter. A plan view of the scene in a virtual environment can be employed to determine the distance between a slow moving object and a character. Based at least in part on the determined distance between the character and the slow moving object, a mixer blends and cross fades a corresponding percentage of each channel during playback of the audio file in the scene.

In one embodiment, the format of the audio file is Windows Audio Video (WAV). However, in other embodiments, the format of the audio file may include Audio Interchange File Format (AIFF), MPEG (MPX), Sun Audio (AU), Real Networks, (RN), Musical Instrument Digital Interface (MIDI), QuickTime Movie (QTM), and the like. In yet another embodiment, the audio file includes multiple channels for surround sound and the file format is AC3, and the like. In still other embodiments, the mixer blends and cross fades channels based on at least one method, including linear, logarithmic, dynamic, and the like.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-104, network 105, and Game Network Device (GND) 106. Network 105 enables communication between client devices 102-104, and GND 106.

Generally, client devices 102-104 may include virtually any computing device capable of connecting to another computing device to send and receive information, including game information, and other interactive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Client devices 102-104 may further include a client application, and the like, that is configured to manage the actions described above.

Moreover, client devices 102-104 may also include a game client application, and the like, that is configured to enable an end-user to interact with and play a game, an interactive program, and the like. The game client may be configured to interact with a game server program, or the like. In one embodiment, the game client is configured to provide various functions, including, but not limited to, authentication, ability to enable an end-user to customize a game feature, synchronization with the game server program, and the like. The game client may further enable game inputs, such as keyboard, mouse, audio, and the like. The game client may also perform some game related computations, including, but not limited to, audio, game logic, physics computations, visual rendering, and the like. In one embodiment, client devices 102-104 are configured to receive and store game related files, executables, audio files, graphic files, and the like, that may be employed by the game client, game server, and the like.

In one embodiment, the game server resides on another network device, such as GND 106. However, the invention is not so limited. For example, client devices 102-104 may also be configured to include the game server program, and the like, such that the game client and game server may interact on the same client device, or even another client device. Furthermore, although the present invention is described employing a client/server architecture, the invention is not so limited. Thus, other computing architectures may be employed, including but not limited to peer-to-peer, and the like.

Network 105 is configured to couple client devices 102-104, and the like, with each other, and to GND 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G), $4^{th}$ (4G) generation radio access for cellular systems, Wireless-LAN, Wireless Router (WR) mesh, and the like. Access technologies such as 2G, 3G, 4G and future access networks may enable wide area coverage for mobile devices, such as client device 102 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), Code Division Multiple Access 2000 (CDMA 2000) and the like.

Furthermore, remote computers and other related electronic devices could be remotely connected to either LANs or WANs via a modem and temporary telephone link. In essence, network 105 includes any communication method by which information may travel between client devices 102-104 and GND 106, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

GND 106 is described in more detail below in conjunction with FIG. 2. Briefly, however, GND 106 includes virtually any network device configured to include the game server program, and the like. As such, GND 106 may be implemented on a variety of computing devices including personal computers, desktop computers, multiprocessor systems, microprocessor-based devices, network PCs, servers, network appliances, and the like.

GND 106 may further provide secured communication for interactions and accounting information to speedup periodic update messages between the game client and the game server, and the like. Such update messages may include, but are not limited to a position update, velocity update, audio update, graphics update, authentication information, and the like.

Illustrative Server Environment

Figure 2:
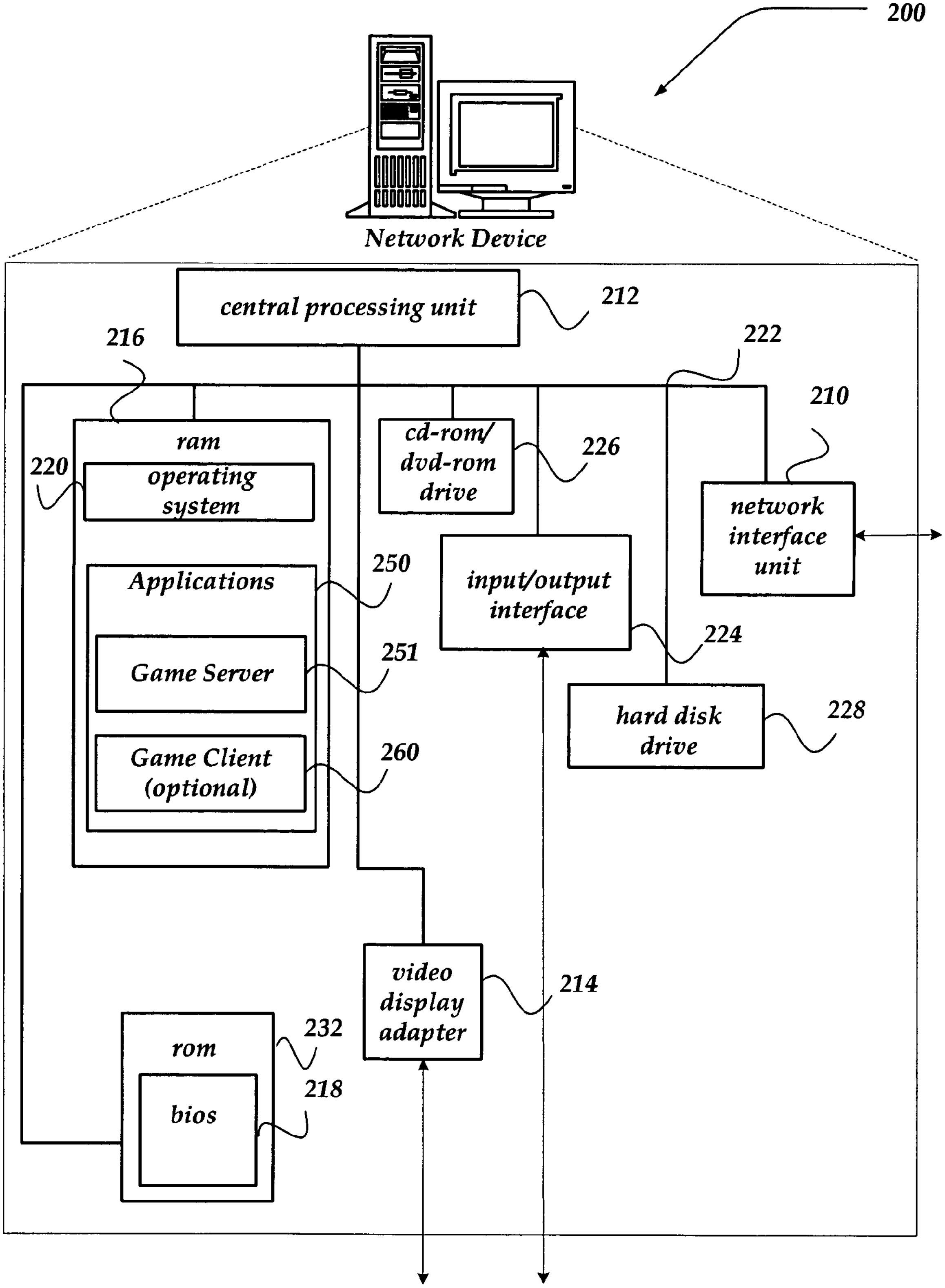
FIG. 2 shows a functional block diagram of one embodiment of a network device configured to operate with a game server.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, GND 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocols. For example, in one embodiment, network interface unit 210 may employ a hybrid communication scheme using both TCP and IP multicast with a client device, such as client devices 102-104 of FIG. 1. Network interface unit 210 is sometimes known as a transceiver, network interface card (NIC), and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. Mass storage may further include applications such as game server 251 and optional game client 260.

Figure 3:
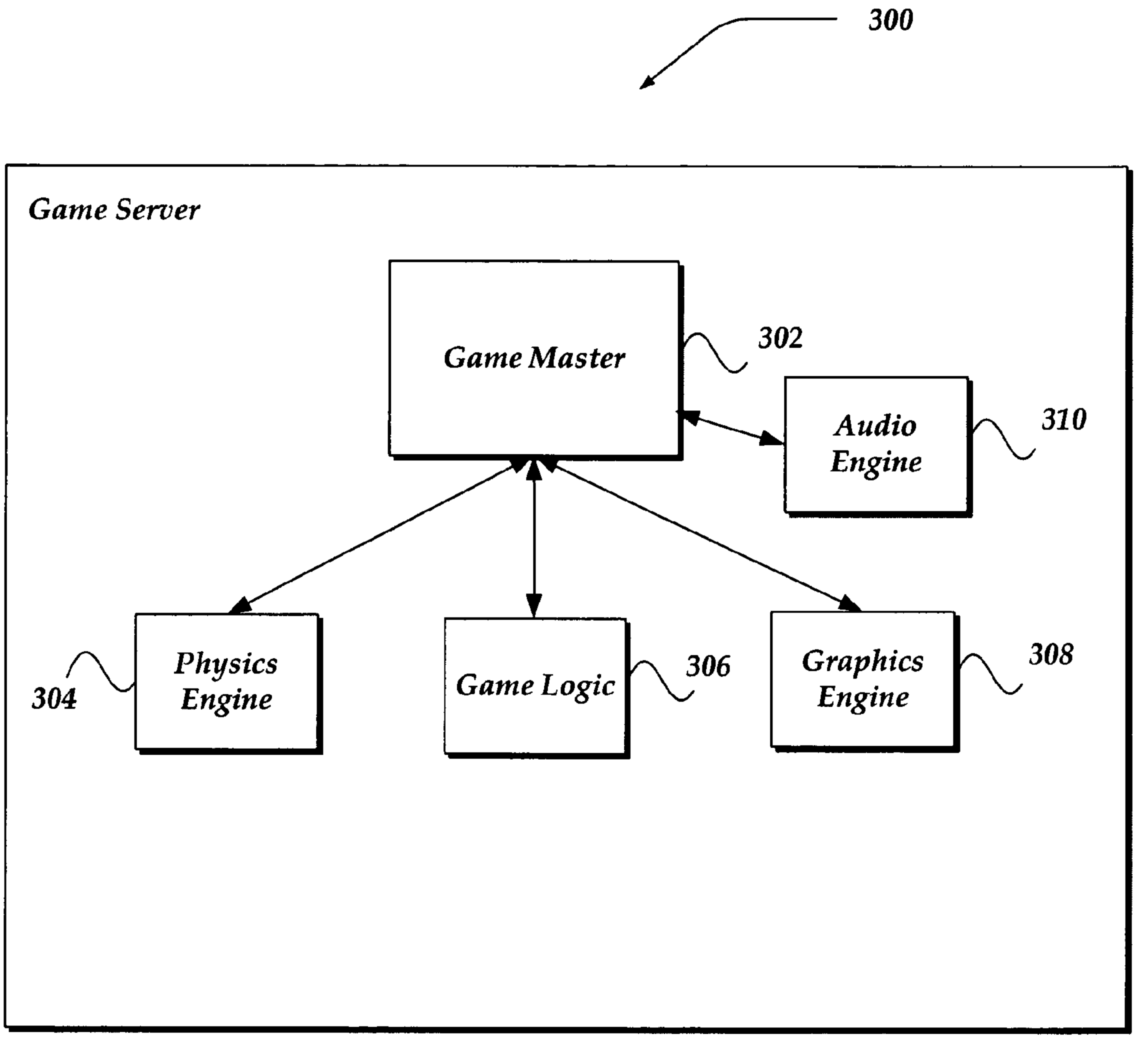
FIG. 3 illustrates a function block diagram of one embodiment of the game server of FIG. 2.

One embodiment of game server 251 is described in more detail in conjunction with FIG. 3. Briefly, however, game server 251 is configured to enable an end-user to interact with a game, and similar three-dimensional modeling programs. In one embodiment, game server 251 interacts with a game client residing on a client device, such as client devices 102-105 of FIG. 1 and/or optional game client 260 residing on network device 200. Game server 251 may also interact with other components residing on the client device, another network device, and the like. For example, game server 251 may interact with a client application, security application, transport application, and the like, on another device.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

FIG. 3 illustrates a function block diagram of one embodiment of a game server for use in GND 106 of FIG. 1. As such, game server 300 may represent, for example, game server 251 of FIG. 2. Game server 300 may include many more components than those shown. The components shown, however, are sufficient to disclose an illustrative embodiment for practicing the invention. It is further noted that virtually any distribution of functions may be employed across and between a game client and game server. Moreover, the present invention is not limited to any particular architecture, and another may be employed. However, for ease of illustration of the invention, a client/server architecture has been selected for discussion below. Thus, as shown in the figure, game server 300 includes game master 302, physics engine 304, game logic 306, and graphics engine 308 and audio engine 310.

Game master 302 may also be configured to provide authentication, and communication services with a game client, another game server, and the like. Game master 302 may receive, for example, input events from the game client, such as keys, mouse movements, and the like, and provide the input events to game logic 306, physics engine 304, graphics engine 308, audio engine 310, and the like. Game master 302 may further communicate with several game clients to enable multiple players, and the like. Game master 302 may also monitor actions associated with a game client, client device, another game server, and the like, to determine if the action is authorized. Game master 302 may also disable an input from an unauthorized sender.

Game master 302 may further manage interactions between physics engine 304, game logic 306, graphics engine 308, and audio engine 310. For example, in one embodiment, game master 302 may perform substantially similar to process 400 described below in conjunction with FIG. 4.

Game logic 306 is also in communication with game master 302, and is configured to provide game rules, goals, and the like. Game logic 306 may include a definition of a game logic entity within the game, such as an avatar, vehicle, and the like. Game logic 306 may include rules, goals, and the like, associated with how the game logic entity may move, interact, appear, and the like, as well. Game logic 306 may further include information about the environment, and the like, in which the game logic entity may interact. Game logic 306 may also included a component associated with artificial intelligence, neural networks, and the like.

Physics engine 304 is in communication with game master 302. Physics engine 304 is configured to provide mathematical computations for interactions, movements, forces, torques, collision detections, collisions, and the like. In one embodiment, physics engine 304 is a provided by a third party. However, the invention is not so limited and virtually any physics engine 304 may be employed that is configured to determine properties of entities, and a relationship between the entities and environments related to the laws of physics as abstracted for a virtual environment.

Physics engine 304 may determine the interactions, movements, forces, torques, collisions, and the like for a physics proxy. Virtually every game logic entity may have associated with it, a physics proxy. The physics proxy may be substantially similar to the game logic entity, including, but not limited to shape. In one embodiment, however, the physics proxy is reduced in size from the game logic entity by an amount epsilon. The epsilon may be virtually any value, including, but not limited to a value substantially equal to a distance the game logic entity may be able to move during one computational frame.

Graphics engine 308 is in communication with game master 302 and is configured to determine and provide graphical information associated with the overall game. As such, graphics engine 308 may include a bump-mapping component for determining and rending surfaces having high-density surface detail. Graphics engine 308 may also include a polygon component for rendering three-dimensional objects, an ambient light component for rendering ambient light effects, and the like. Graphics engine 308 may further include an animation component, an eye-glint component, and the like. However, graphics engine 308 is not limited to these components, and others may be included, without departing from the scope or spirit of the invention. For example, additional components may exist that are employable for managing and storing such information, as map files, entity data files, environment data files, color palette files, texture files, and the like.

Audio engine 310 is in communication with game master 302 and is configured to determine and provide audio information associated with the overall game. As such, audio engine 310 may include an authoring component for generating audio files associated with position and distance of objects in a scene of the virtual environment. Audio engine 310 may further include a mixer for blending and cross fading channels of spatial sound data associated with objects and a character interacting in the scene.

In another embodiment, a game client can be employed to assist with or solely perform single or combinatorial actions associated with game server 300, including those actions associated with game master 302, audio engine 310, graphics engine 308, game logic 306, and physics engine 304.

Illustrative Plan Views

Figure 4:
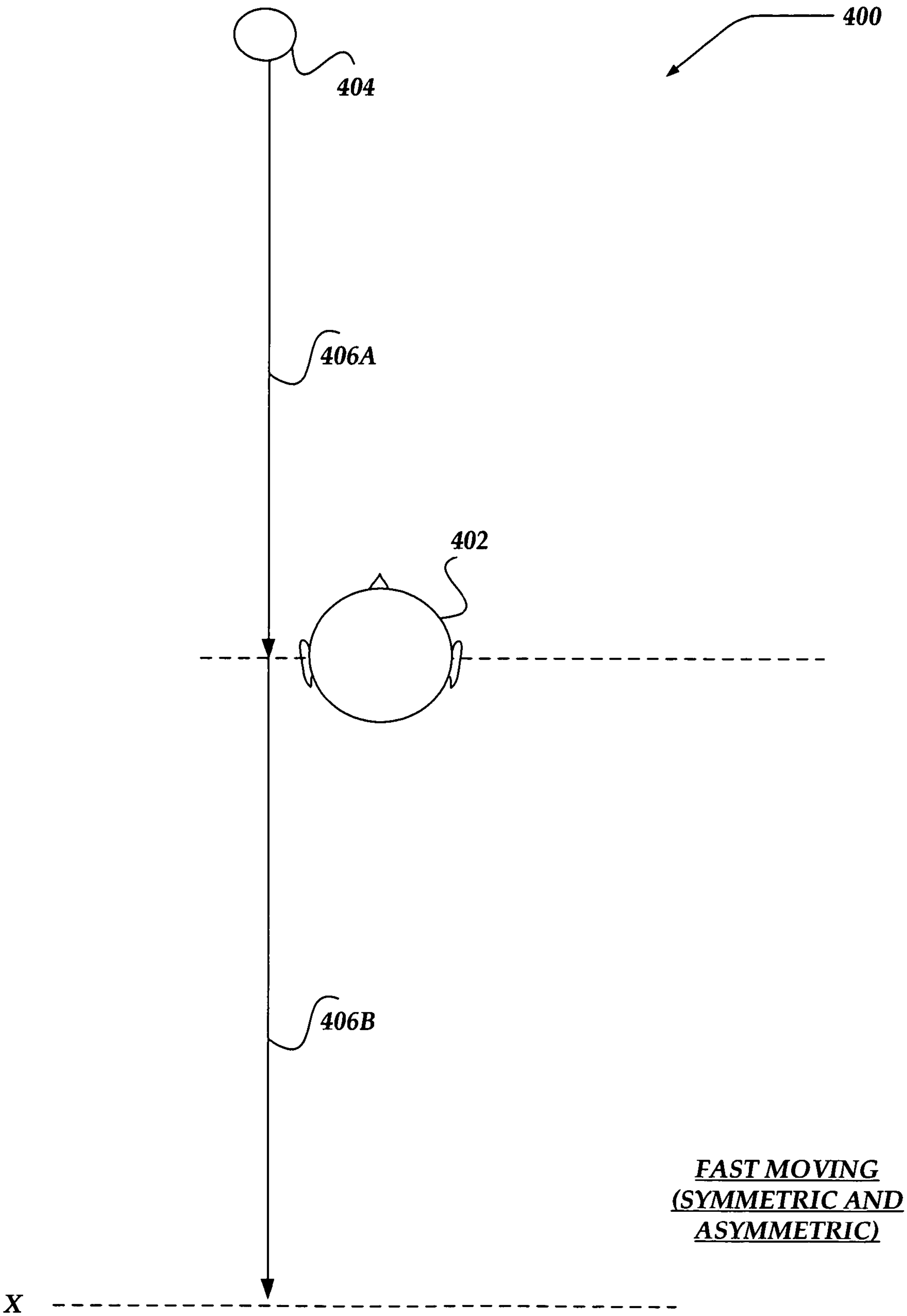
FIG. 4 shows a schematic plan view for fast moving objects in a scene of a virtual environment.

FIG. 4 illustrates plan view 400 of the position of head 402 of a character disposed in the center of a scene for a virtual environment. Fast moving object 404 is disposed in the upper left quadrant of plan view 400. Line segments 406A and 406B illustrate a path and direction for fast moving object 404 as it approaches, passes by and then retreats from head 402 to point "X" in the scene. In particular, line segment 406A illustrates the path and direction as fast moving object 404 approaches head 402 and line segment 406B illustrates a continuation of that path and direction as fast moving object 404 retreats from head 402. Also, since fast moving object 404 is initially disposed relatively far away from head 402, the distance/length of line segment 406A is substantially equivalent to the distance/length of line segment 406B.

As discussed above and below, the length (distance) and position of each line segment associated with a fast moving object is employed to record spatial approaching sound data and spatial retreating sound data in separate channels of an audio file. As the audio file for the fast moving object is played, the spatial approaching sound data in one channel is first played at some point along line segment 406A, and then the spatial retreating sound data in the other channel is subsequently played at some point along line segment 406B to simulate the sound of the object moving quickly from its initial position to point "X" in the scene. The points chosen for playback of the approach and retreat sounds along line segments 406A and 406B may be equidistant from head 402. This distance may be selected to approximate the closest point of approach between an original fast moving sound source and an encoding device location, such as a microphone, and the like.

Additionally, although fast moving object 404 is shown having a direction that is substantially parallel to head 402, the direction can be arbitrary for other fast moving objects in part due to their relatively high rates of speed. Also, the typical durations of the approach and retreat sounds for fast moving objects are relatively the same.

Figure 5:
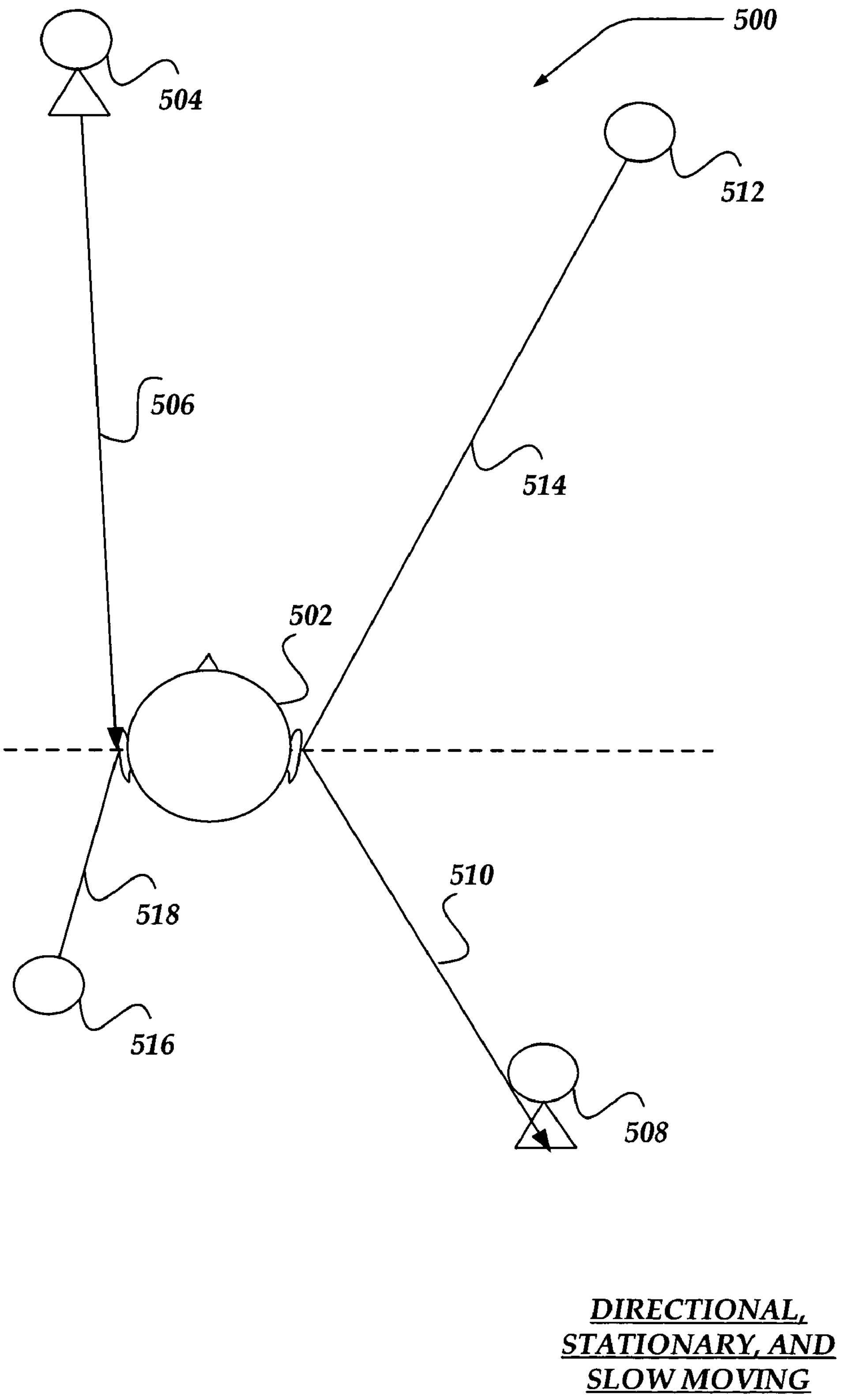
FIG. 5 illustrates a schematic plan view for directional, stationary, and slow moving objects in a scene of a virtual environment.

FIG. 5 illustrates plan view 500 of the position of head 502 of a character disposed in the center of a scene for a virtual environment. Directional object 504 is disposed in the upper left quadrant and directional object 508 is disposed in the lower right quadrant of plan view 500. Line segment 506 illustrates the distance and direction of sound emitted by directional object 504 in regard to head 502. Similarly, line segment 510 illustrates the distance and direction of sound emitted by directional object 508.

As discussed above and below, the length (distance), position, and direction of the line segment associated with the directional object is employed to record spatial frontward sound data and spatial rearward sound data in separate channels of an audio file. As the audio file for the directional object is played, the spatial frontward sound data in one channel along with the spatial rearward sound data in the other channel can be blended and cross faded based on the distance, position and direction of the directional object in regard to the head in the scene.

For example, the playing of the audio file recorded for directional object 504 would generally entail muting a volume of the channel for spatial rearward sound data and playing the other channel for spatial frontward sound data at a volume determined in part by the length, position and direction of line segment 506. The volume of the spatial rearward sound data would be muted in part because of the position and direction of line segment 506.

Similarly, the playing of the audio file recorded for directional object 508 would generally entail simultaneously playing the channel for spatial rearward data at a volume substantially lower than another volume for playing the other channel for spatial frontward data. These two volumes would be based at least in part on the distance, direction and position of the directional object in regard to the head in the scene.

Slow moving object 512 is disposed in the upper right quadrant and stationary object 516 is disposed in the lower left quadrant of plan view 500. Line segment 514 illustrates the distance of sound emitted by slow moving object 512 in regard to head 502. Similarly, line segment 518 illustrates the distance of sound emitted by stationary object 516.

As discussed above and below, the length (distance of the line segment associated with the slow moving and stationary object is employed to record spatial near sound data (high frequency) and spatial far sound data (low frequency) in separate channels of an audio file. As the audio file for the stationary or slow moving object is played, the spatial near sound data in one channel along with the spatial far sound data in the other channel can be blended and cross faded based on the distance of the object in regard to the head in the scene.

Illustrative File Formats

Figure 6:
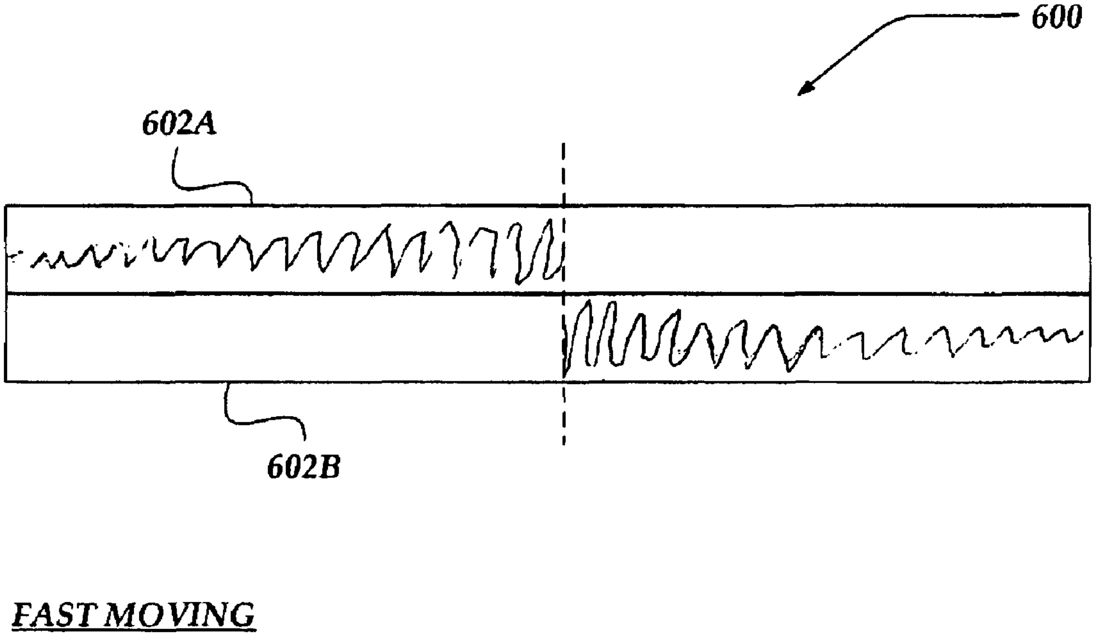
FIG. 6 shows a block diagram of two channels in an audio file associated with a fast moving object.

FIG. 6 illustrates channels in audio file 600 which is associated with a fast moving object. Channel 602A includes spatial approaching sound data and channel 602B includes spatial retreating sound data. The dotted line illustrates the moment when the fast moving object passes by the character in the scene.

Figure 7A:
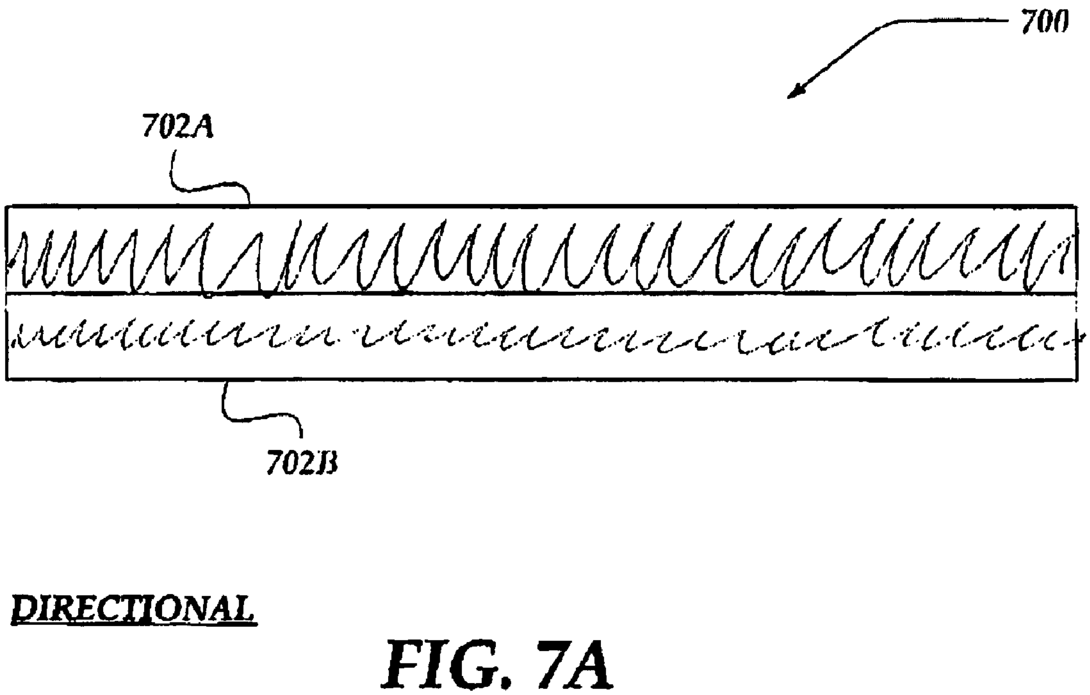
FIG. 7A shows a block diagram of two channels in an audio file associated with a directional object.

FIG. 7A illustrates channels in audio file 700 which is associated with a directional object. Channel 702A includes spatial frontward sound data and channel 702B includes spatial rearward sound data.

Figure 7B:
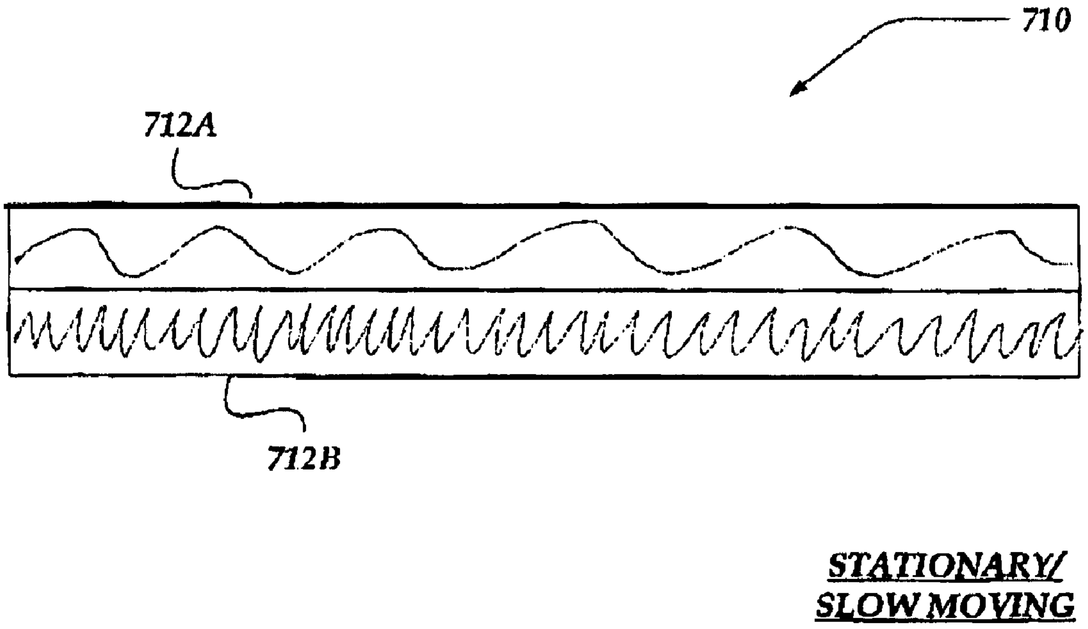
FIG. 7B illustrates a block diagram of two channels in an audio file associated with a stationary or slow moving object.

FIG. 7B illustrates channels in audio file 710 which can be associated with a stationary object or a slow moving object. Channel 712A includes spatial far sound data (low frequency) and channel 712B includes spatial near sound data (high frequency).

Illustrative Flowcharts

Figure 8:
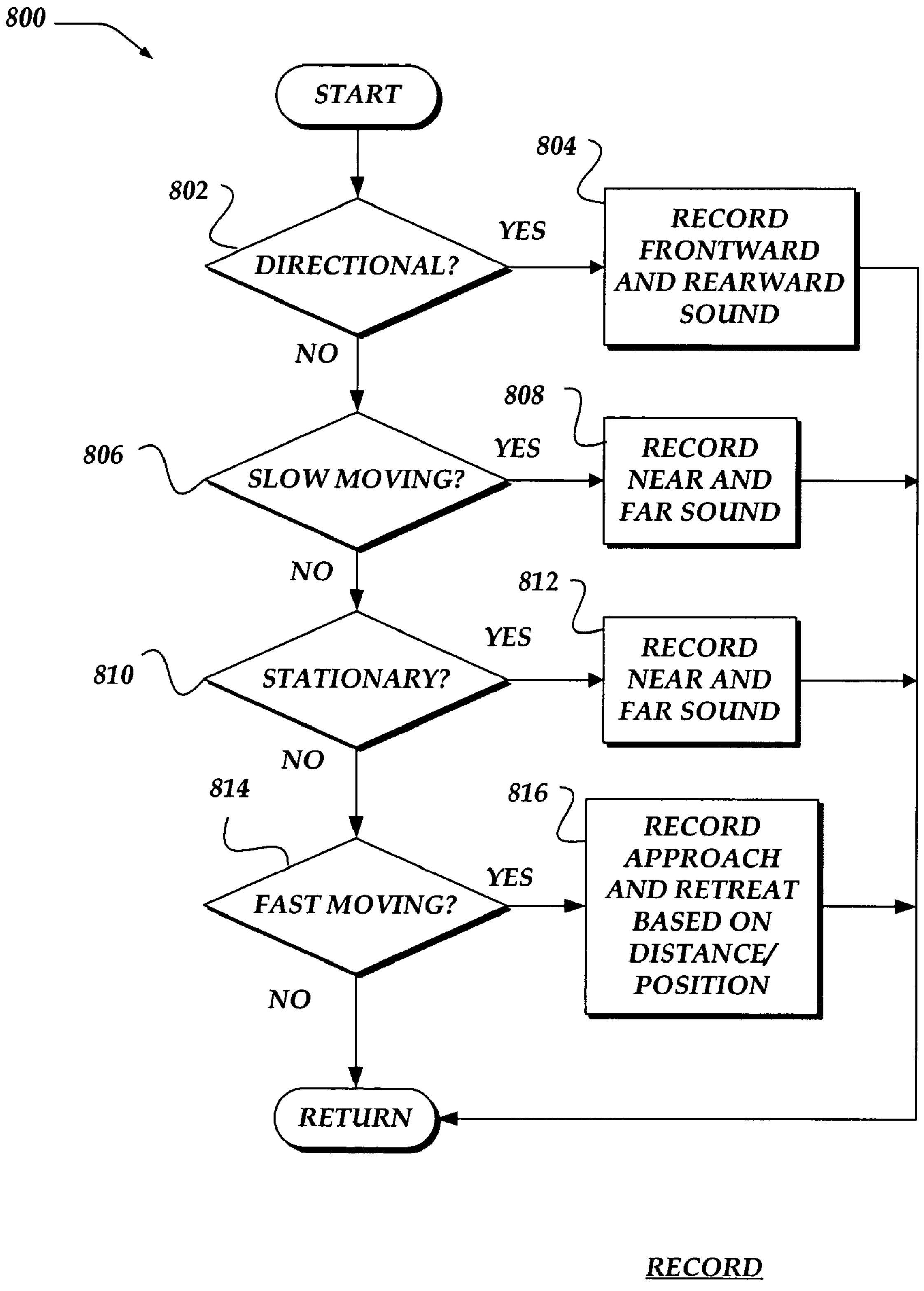
FIG. 8 illustrates a flow diagram generally showing one embodiment of a process for recording multiple channels in an audio file associated with an object in a scene of a virtual environment.

FIG. 8 illustrates flow chart 800 for recording spatial sound data for an object in at least two channels of an audio file associated with the object. Once an object that generates sound is detected, the process moves to decision block 802 where a determination is made as to whether a type of the object is directional. If true, the process moves to block 804 where the spatial frontward sound data is recorded in one channel of an audio file and the spatial rearward sound data is recorded in another channel of the audio file. Next, the process returns to performing other actions such as those discussed in FIG. 9.

However, if the determination at decision block 802 is negative, the process advances to decision block 806 where a determination is made as to whether the type of the object is slow moving. If true, the process moves to block 808 where the spatial near sound data is recorded in one channel of an audio file and the spatial far sound data is recorded in another channel of the audio file. Next, the process returns to performing other actions such as those discussed in FIG. 9.

Alternatively, if the determination at decision block 806 is negative, the process advances to decision block 810 where a determination is made as to whether the type of the object is stationary. If true, the process moves to block 812 where the spatial near sound data is recorded in one channel of an audio file and the spatial far sound data is recorded in another channel of the audio file. Next, the process returns to performing other actions such as those discussed in FIG. 9.

Additionally, if the determination at decision block 810 is negative, the process advances to decision block 814 where a determination is made as to whether the type of the object is fast moving. If true, the process moves to block 816 where the spatial approaching sound data is recorded in one channel of an audio file and the spatial retreating sound data is recorded in another channel of the file based at least in part on the distance and position of the object in regard to a character in a scene. Next, the process returns to performing other actions such as those discussed in FIG. 9.

Figure 9:
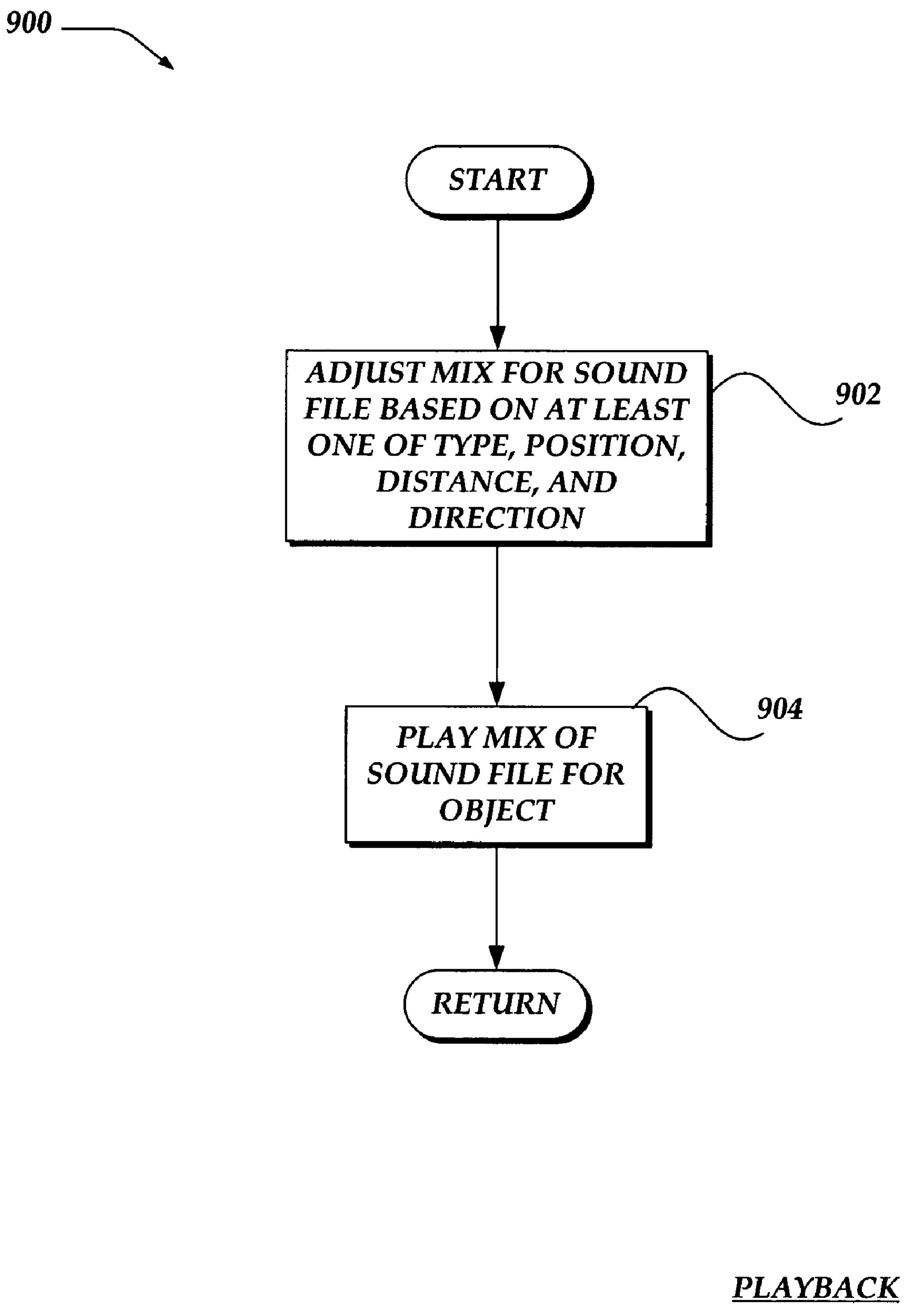
FIG. 9 shows a flow diagram generally showing one embodiment of a process for playing multiple channels in an audio file associated with an object in a scene of a virtual environment, in accordance with the invention.

FIG. 9 illustrates flowchart 900 for playing an audio file associated with an object in a scene with a character controlled by a user. As indicated in the discussion of FIG. 8 and elsewhere in the specification, spatial sound data is recorded in channels for an audio file associated with an object. Moving from a start block, the process flows to block 902 where the mix for playing the spatial sound data in the channels of the audio file associated with an object are mixed (blended and/or cross faded) based at least in part on type, distance, position, and direction. For example, the mix associated with a directional type of object would be based on the direction, position and distance of the object in regard to the character in the scene. Also, the mix for the stationary or slow moving objects would be based on the distance of the object in regard to the character in the scene. Additionally, the mix for the fast moving object would be relatively neutral, since the spatial sound data is recorded in the channels of the sound file based at least in part on the distance and position of the object to the character.

Moving from the logic associated with block 902, the process advances to block 904 where the mix of the sound file is played for the object. Next, the process returns to performing other actions.

Additionally, although the invention can record and play the sound of an object from a first person perspective of a character in a scene of a virtual environment, it is not so limited. Rather, the invention can also record and play sound from other perspectives in the scene, including, but not limited to, third person, and another character controlled by another user or another process. Also, the inventive determination and playing of spatial sound data based on position, distance, and direction of an object in a scene can be less computationally intensive than making similar determinations based on the position and velocity of the object in the scene.

Moreover, it will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for providing spatial sound data associated with a fast moving object in a scene for a virtual environment, comprising:

determining if the object is currently moving fast through the scene based on at least one of position, distance and direction for the object in regard to a point of view in the scene;

providing pre-recorded spatial sound data in at least two channels of a single audio file associated with the determined object moving fast through the scene, wherein the pre-recorded spatial sound data includes at least spatial approaching sound data recorded in a first channel of the audio file and spatial retreating sound data recorded in a second channel of the audio file; and consecutively playing the pre-recorded spatial sound data for each of the at least two channels of the audio file associated with the object as it moves past the point of view in the scene, wherein the consecutive playing of the pre-recorded spatial sound data simulates approaching and retreating sound associated with the object moving past the point of view in the scene.

2. The method of claim 1, wherein the point of view is at least one of a character in the scene, a third person perspective, and another character in the scene.

3. The method of claim 1, further comprising determining a type of the object based at least in part on the point of view in the scene.

4. The method of claim 1, wherein the spatial approaching sound data is played in one sound amplification device and the spatial retreating sound data is played in another sound amplification device.

5. The method of claim 1, further comprising cross fading at least two channels of the audio file.

6. The method of claim 1, wherein the audio file further includes a format of at least one of Windows Audio Video (WAV), Audio Interchange File Format (AIFF), MPEG (MPX), Sun Audio (AU), Real Networks (RN), Musical Instrument Digital Interface (MIDI), QuickTime Movie (QTM), and AC3.

7. The method of claim 1, wherein the virtual environment is at least one of a video game, chat room, and a virtual world.

8. The method of claim 1, wherein playing the pre-recorded spatial sound data comprises switching from playing the first channel of the audio file to playing the second channel of the audio file when the object passes from a forward position to a rearward position, or from a rearward position to a forward position, relative to the point of view.

9. A method for playing spatial sound data associated with a fast moving object in a scene for a virtual environment, comprising:

determining if the object is currently moving fast through the scene based on at least one of position, distance and direction for the object in regard to a point of view in the scene;

providing pre-recorded spatial sound data in at least two channels of a single audio file associated with the determined object moving fast through the scene, wherein the pre-recorded spatial sound data includes spatial approaching sound data recorded in a first channel of the audio file and spatial retreating sound data recorded in a second channel of the audio file; and consecutively playing the pre-recorded spatial sound data for each of the at least two channels of the audio file associated with the object as it moves past the point of view in the scene, wherein the consecutive playing of the pre-recorded spatial sound data is based at least in part on distance, position and direction of the object in regard to the point of view in the scene, and wherein the playing of the pre-recorded spatial sound data enables the simulation of approaching and retreating sound associated with the object moving past the point of view in the scene.

10. The method of claim 9, wherein playing the pre-recorded spatial sound data comprises switching from playing the first channel of the audio file to playing the second channel of the audio file when the object passes from a forward position to a rearward position, or from a rearward position to a forward position, relative to the point of view.

11. A server for enabling the playing of spatial sound data associated with a fast moving object in a scene in a virtual environment, comprising:

a memory for storing data; and an audio engine for performing actions, including:

enabling the determining if the object is currently moving fast through the scene based on at least one of position, distance and direction for the object in regard to at least a point of view in the scene and a type of the object;

enabling the providing of pre-recorded spatial sound data in at least two channels of a single audio file associated with the determined object moving fast through the scene, wherein the pre-recorded spatial sound data includes at least spatial approaching sound data recorded in a first channel of the audio file and spatial retreating sound data recorded in a second channel of the audio file; and enabling the consecutive playing of the pre-recorded spatial sound data for each of the at least two channels of the audio file associated with the object, wherein the consecutive playing of the pre-recorded spatial sound data simulates approaching and retreating sound associated with the object moving past the point of view in the scene.

12. The server of claim 11, wherein the actions performed by the audio engine further comprise switching from playing the first channel of the audio file to playing the second channel of the audio file when the object passes from a forward position to a rearward position, or from a rearward position to a forward position, relative to the point of view.

13. A client for enabling the playing of spatial sound data associated with a fast moving object in a scene in a virtual environment, comprising:

a memory for storing data; and an audio engine for performing actions, including:

enabling determining if the object is currently moving fast through the scene based on at least one of position, distance and direction for the object in regard to at least a point of view in the scene and a type of the object;

enabling the providing of pre-recorded spatial sound data in at least two channels of a single audio file associated with the determined object moving fast through the scene, wherein the pre-recorded spatial sound data includes at least spatial approaching sound data recorded in a first channel of the audio file and spatial retreating sound data recorded in a second channel of the audio file; and enabling the consecutive playing of the pre-recorded spatial sound data for each of the at least two channels of the audio file associated with the object, wherein the consecutive playing of the pre-recorded spatial sound data simulates approaching and retreating sound associated with the object moving past the point of view in the scene.

14. The client of claim 13, wherein the actions performed by the audio engine further comprise switching from playing the first channel of the audio file to playing the second channel of the audio file when the object passes from a forward position to a rearward position, or from a rearward position to a forward position, relative to the point of view.

15. A computer readable storage medium with instructions for performing actions stored thereon, the instructions comprising:

determining if the object is currently moving fast through the scene based on at least one of position, distance and direction for the object in regard to a point of view in the scene;

providing pre-recorded spatial sound data in at least two channels of a single audio file associated with the determined object moving fast through the scene, wherein the pre-recorded spatial sound data includes at least spatial approaching sound data recorded in a first channel of the audio file and spatial retreating sound data recorded in a second channel of the audio file; and consecutively playing the pre-recorded spatial sound data for each of the at least two channels of the audio file associated with the object as it moves past the point of view in the scene, wherein the consecutive playing of the pre-recorded spatial sound data simulates approaching and retreating sound associated with the object moving past the point of view in the scene.

16. The computer readable storage medium of claim 15, wherein the instructions further comprise switching from playing the first channel of the audio file to playing the second channel of the audio file when the object passes from a forward position to a rearward position, or from a rearward position to a forward position, relative to the point of view.

* * * * *